United States Patent
Honhold

(10) Patent No.: US 6,644,181 B2
(45) Date of Patent: Nov. 11, 2003

(54) BINDING DEVICE FOR A BIG BALER

(75) Inventor: Joost Honhold, Wolfenbüttel (DE)

(73) Assignee: Lely Maschinenfabrik GmbH, Wolfenbüttel (DE)

( * ) Notice: Subject to any disclaimer, the term of this patent is extended or adjusted under 35 U.S.C. 154(b) by 0 days.

(21) Appl. No.: 10/021,792

(22) Filed: Nov. 30, 2001

(65) Prior Publication Data

US 2002/0066375 A1 Jun. 6, 2002

(51) Int. Cl.$^7$ ............................................... B65B 57/10
(52) U.S. Cl. ............................ 100/4; 100/19 R; 56/343
(58) Field of Search ................................. 100/4, 11, 17, 100/18, 19 R, 20–24, 29, 31, 32; 56/341, 343, 433; 192/28, 33 R; 289/13, 14; 74/530

(56) References Cited

U.S. PATENT DOCUMENTS

| | | | | |
|---|---|---|---|---|
| 670,407 A | * | 3/1901 | Krishman ................. 279/103 |
| 670,410 A | * | 3/1901 | Medlin .................... 100/19 R |
| 893,216 A | * | 7/1908 | Wood ......................... 100/11 |
| 949,857 A | * | 2/1910 | Sweeney .................... 100/11 |
| 999,200 A | * | 8/1911 | Bowers ...................... 100/11 |
| 2,807,204 A | * | 9/1957 | Eby et al. .................. 100/23 |
| 4,083,441 A | * | 4/1978 | Young ........................ 192/28 |
| 4,142,746 A | * | 3/1979 | White ......................... 289/2 |
| 5,782,175 A | * | 7/1998 | Schrag ......................... 100/4 |
| 5,937,746 A | * | 8/1999 | Jonckheere et al. ........... 100/4 |
| 6,070,403 A | * | 6/2000 | Hawlas ...................... 56/341 |
| 6,073,426 A | * | 6/2000 | Mesmer et al. ........... 56/10.2 R |

FOREIGN PATENT DOCUMENTS

| | | |
|---|---|---|
| DE | 1095044 | * 12/1960 |
| GB | 0775630 | 5/1957 |

* cited by examiner

Primary Examiner—Allen Ostrager
Assistant Examiner—Jimmy T Nguyen
(74) Attorney, Agent, or Firm—Sidley Austin Brown & Wood, LLP

(57) ABSTRACT

A binding device for a baler including at least one twine needle, a knotter shaft for driving the needle, a one-stop clutch for connecting the knotter shaft with the plunger drive and for intermittently driving the knotter shaft, and a transmission unit provided between the one-stop clutch and the knotter shaft and including elements which insure that for one complete revolution of the one-stop clutch, the knotter shaft also performs one complete revolution but with a higher speed than the one-stop clutch.

13 Claims, 4 Drawing Sheets

BINDING DEVICE FOR A BIG BALER

BACKGROUND OF THE INVENTION

1. Field of the Invention

The present invention relates to a binding device for a baler including at least one knotter and a twine needle driven by the knotter shaft driven by the baler plunger drive, a one-stop clutch for connecting the knotter shaft with the plunger drive and for intermittently driving the knotter shaft, and transmission means provided between the one-stop clutch and the knotter shaft.

2. Description of the Prior Art

Such knotters are most often used in balers for forming bales of agricultural harvest goods, but they can also be used for forming bales from paper products, paperboards, recyclable products, and the like. Generally, a plurality of knotters are arranged next to each other over the baling channel. When a bale reaches a predetermined length, the knotter secures the bale with twine loops.

All of the presently available on the market balers use a knotter the shaft of which is driven so that the drive ratio between the knotter shaft and the crank drive of the plunger is 1:1. The knot formation starts only when the plunger moves back from its compressing end position. With the return movement of the plunger, the material of the twine loop expands, with the twine being tightened by the twine needle. This, however, results in a rather high "loosening" of the twine with a loss of a portion of the compressed density of the bale. Other drawbacks of a conventional binding device are apparent from German Publication DE 1095044 that addresses those drawbacks. Namely, with large dimensions of bales (with a cross-section 1.2 m×1.2 m and a length of 2.5 m), several knotters are used which are arranged next to each other. Therefore, production tolerances of separate knotters are added to each other and, as a result, a very fine adjustment of the knotters is necessary. In addition, the twine needles can become damaged during a following compression, as the needle partially remains in the baling channel when a next compression cycle starts.

The solution according to DE 10 95 044 is based on an idea to change the drive ratio between the plunger stroke and a revolution of the knotter shaft to 1:2, so that the knot formation takes place in the compressing end position of the plunger (at front dead point in the compression direction), i.e., is performed in half time. With this, the input drive shaft of the one-stop clutch is driven with a double rotational speed in comparison with the speed of an input drive shaft as opposed to the speed of the input drive shaft of the one-step clutch being equal to the input drive shaft speed when the drive ratio is 1:1. However, an expansive switch mechanism becomes necessary for controlling the operation of the one-stop clutch in dependence on the operation of the plunger. In addition to a complex and prone to failure design of the kinematic mechanism, the disclosed binding device has two other big drawbacks. As the knot formation takes place at the dead point, very high forces acting on the twine are generated. Therefore, the twine loop should be able to withstand the expansion force of the compressed bale that are produced by the plunger in its compressing end position. In addition, the drive or transmission ratio 1:2 is determined by the system and cannot be changed.

Because of the foregoing drawbacks, the solution according to DE 10 95 044 did not find a practical application. Despite numerous attempts (see, e.g., DE 10 69 419) to find a solution of the above-discussed problem, no solution, which could have a practical application, was found.

Accordingly, an object of the invention is to provide an improved binding device for a baler and including simple means for controlling operation of the knotter shaft.

SUMMARY OF THE INVENTION

These and other objects of the present invention, which will become apparent hereinafter, are achieved by providing in the transmission means, means that would insure that for one complete revolution of the one-stop clutch, the knotter shaft also performs one complete revolution but with a speed twice of that of the one-stop clutch.

According to the present invention, the engagement of the knotter shaft takes place, in the power flow direction, after the one-stop clutch. As a result, the one-stop clutch can be driven with a transmission ratio of 1:1 with respect to the crank drive of the plunger, without a need in additional control means for controlling the operation of the one-stop clutch. The actuation of the one-stop clutch is controlled by a measurement wheel, which determines or detects the length of the formed bale, independent from the plunger operation, as in the conventional balers. Therefore, the start of the rotation of the knotter shaft need not be changed in comparison with conventional balers, but the twine needle moves in and out of the baling channel with a greater speed. The transmission ratio determines the speed of the twine needle movement in and out of the baling channel and can be varied. Thus, according to the selected transmission ratio, the binding can start after the plunger dead point or in the dead point. However, the further away from the dead point the binding starts, the greater would be the twine loosening and the loss of the compressed density of the formed bale.

Further advantages of the present invention consists in that:

The twine needle leaves the baling channel earlier and, as a result, danger of the needle being damaged during a following compression stroke of the plunger is eliminated;

The bale shape and its compression density are improved, as no or smaller twine loosening takes place;

The twine needle/plunger adjustment can be more reliably selected because the plunger has a greater overrun with respect to the twine needle;

Use of larger adjustment tolerances becomes possible; and

The inventive design requires use of only small number of additional components, with other components remaining the same as in the conventional constructions.

In a preferred embodiment of the present invention, the one-stop clutch drives the knotter shaft or a connecting shaft via a tooth wheel or face gear segment and a tooth wheel or pinion mounted on the knotter shaft or the connecting shaft. By selecting transmission ratio, engagement length, and engagement time period, the time of the knot formation can be so selected that the bale is tied in the vicinity of the dead point, i.e., at a point when the plunger only starts to withdraw from its compressing end position. Basically, it is also possible to provide an arrangement with which the transmission means includes a gear unit arranged between the knotter shaft and the one-stop clutch and an additional clutch for connecting the gear unit with the knotter shaft and providing for a complete revolution of the knotter shaft upon actuation of the one-stop clutch.

The present invention expands the variation possibilities of the controlling operation of the binding device without electronic measurement of the bale length and actuation of the one-stop clutch.

To reduce the weight of the device, at least some of the components of the needle drive, the one-stop clutch and the transmission means, are formed of a light metal.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
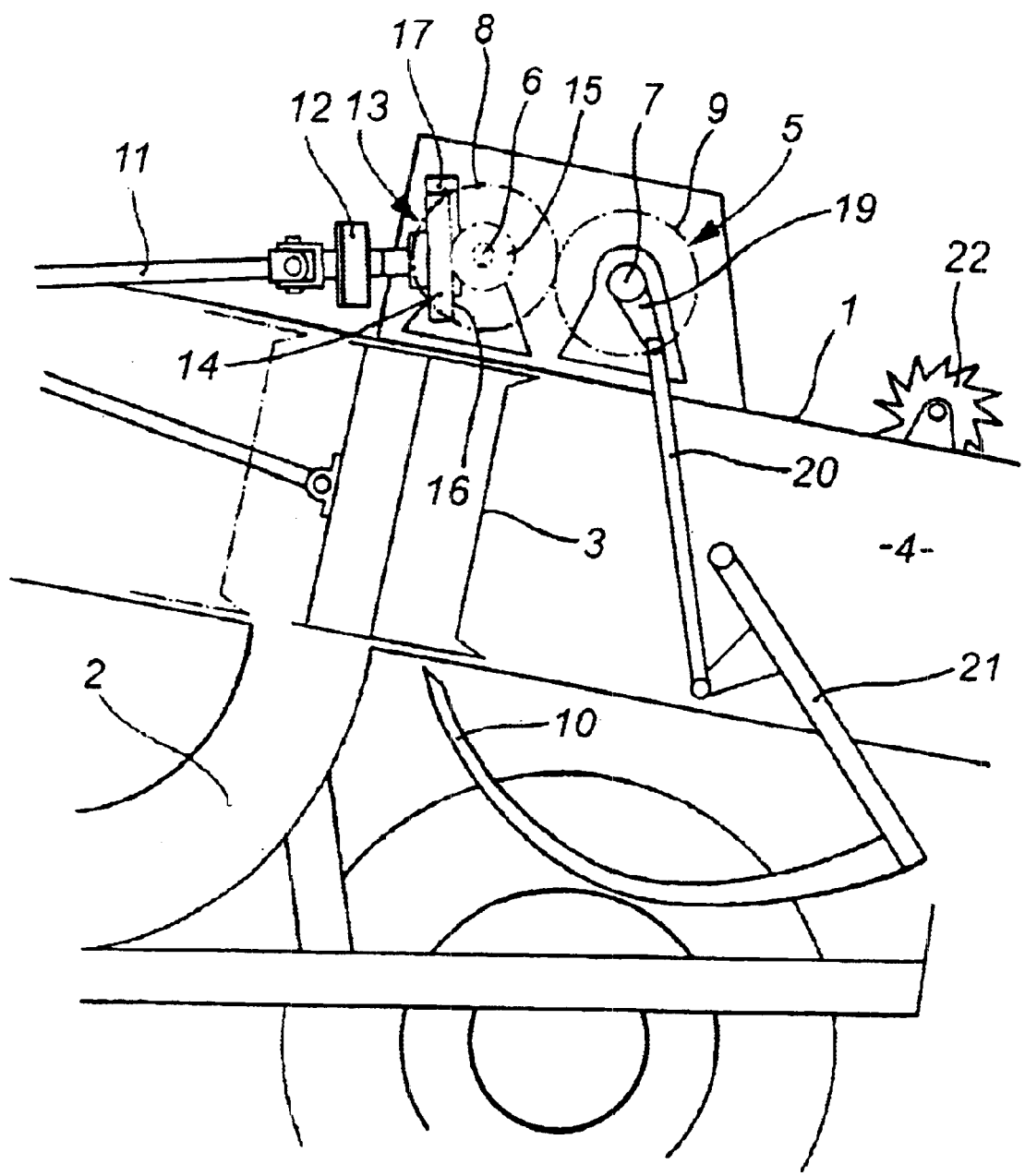
FIG. 1 a side view of a baling channel of a big baler with a region of a binding device.
Figure 2:
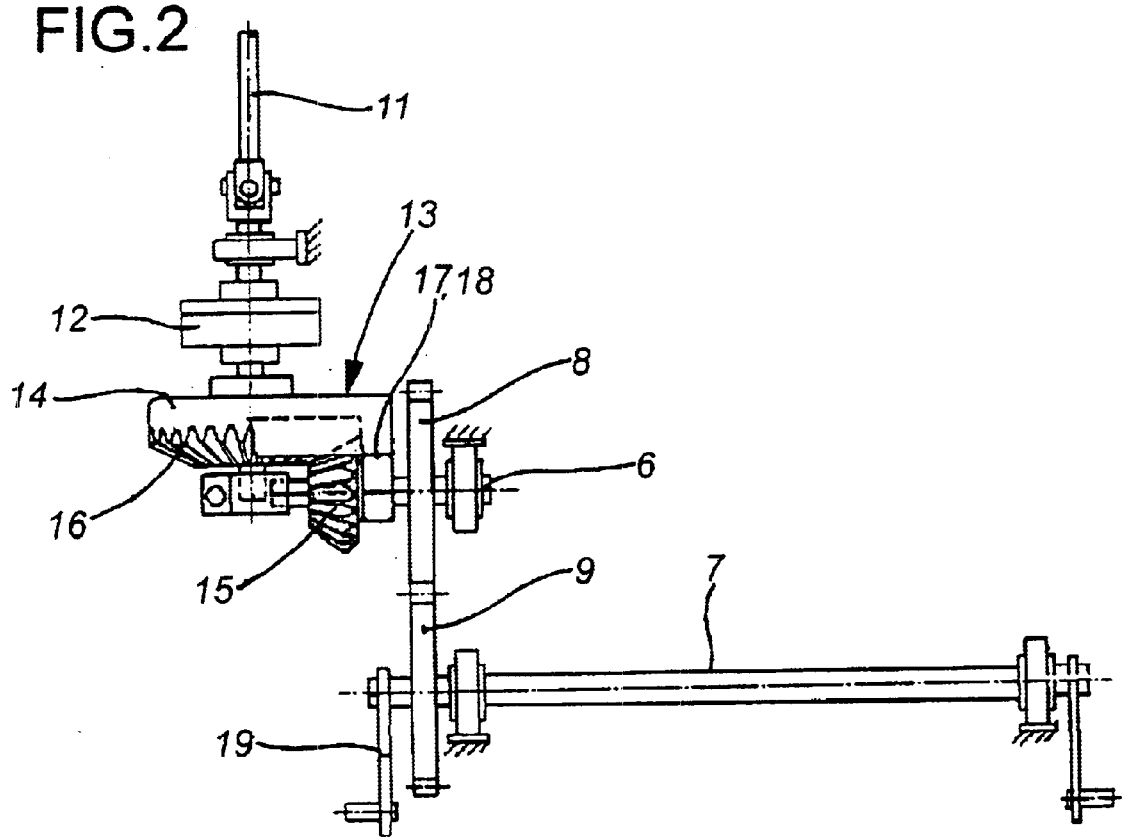
FIG. 2 a schematic view of a first embodiment of a drive system of the binding device according to the present invention.
Figure 3:
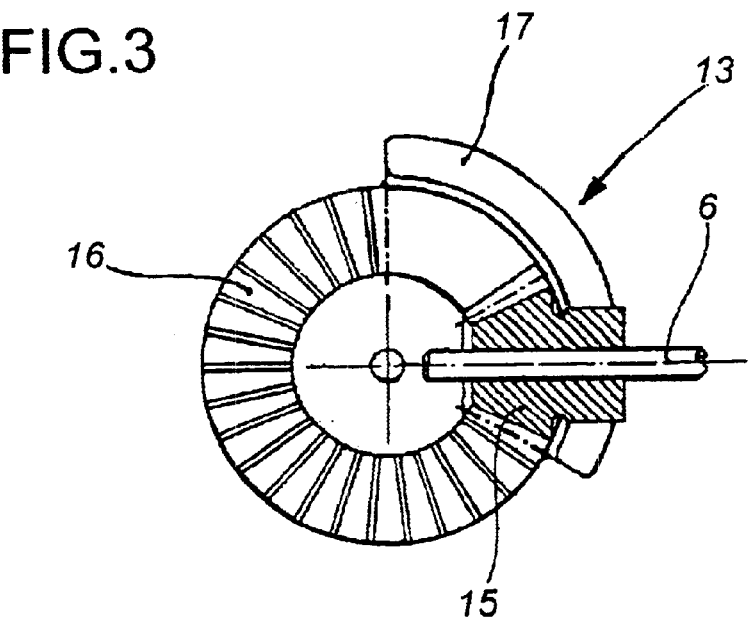
FIG. 3 a schematic view, at an increased, in comparison with FIG. 2, scale of a full gear segment together with a pinion shown in FIG. 2.

A big baler 1, which is shown partially in FIG. 1, includes a delivery channel 2, a plunger 3, a baling channel 4, and a binding device 5. The baler 1 cooperates with a twine knotter (not shown) driven by a knotter shaft 7 that extends parallel to a connecting shaft 6 and is driven thereby. Respective spur gears 8, 9, which engage each other and have the same number of teeth, are fixedly secured on the connecting shaft 6 and the knotter shaft 7, respectively. The spur gears 8 and 9 provide for transmission of a rotational movement from the connecting shaft 6 to the knotter shaft 7. The knotter shaft 7 drives twine needles 10 and twine knotters (not shown) that cooperate with respective twine needles 10. The drive transmission is effected from a drive (not shown) by a drive shaft 11. The transmission ratio between the shaft 11 and the drive of the plunger 3 is 1:1. The drive shaft 11 is arranged perpendicular to the connecting shaft 6. A one-stop clutch 12 is mounted on the drive shaft 11 that is connected with the connecting shaft 6 by an angular drive 13. The angular drive 13 is formed of a face gear 14 fixedly connected with the output side of the one-stop clutch 12, and a pinion 15 fixedly mounted on the connecting shaft 6 and engageable with the face gear 14.

The face gear 14 includes a face gear segment 16 covering an angle of about 240°. The remaining portion of the face gear 14, which is spread over an angle of about 120°, as complemented by a slide surface 17 formed as an eccentric surface with respect to the segment 16. As it has already been discussed above, the face gear segment 16 is engageable with the pinion 15 that has the same number of teeth as the face gear segment 16 or one tooth more and has a smooth cylindrical section 18 axially adjoining the tooth section. As a result, in the embodiment shown and described here, the knotter shaft 7 performs a complete revolution, while the one-stop clutch 12 performs only two/third of a revolution upon engagement of the pinion 15 with the face gear 14. During the final one/third revolution of the one-stop clutch 12 and the face gear 14, the smooth cylindrical section 18 of the pinion 15 engages the smooth eccentric surface 17 and rolls thereover, whereby mutual engagement of the face gear 14 and the pinion 15 is insured. In this way, the drive ratio between the knotter shaft 7 and the drive shaft 11 amounts to 1:1.5, i.e., the rotational speed of the knotter shaft 7 amounts to 1.5 of the rotational speed of the drive shaft 11. It is also possible to reduce the angular region of the face gear segment 16 to 120°, so that the knotter shaft would perform a complete revolution, with the one-stop clutch 12 and the face gear 14 performing one/third of a revolution. In this case also, the face gear 14 could be formed with a slide surface. Providing of a smooth surface on the face gear permits to select the start of rotation of the knotter shaft 7 so that the start would coincide with an optimal time point of the knot formation. From the knotter shaft 7, the drive is transmitted to the twine needles via a crank 19, a tie rod 20, and rocker arm 21.

During formation of a bale, the drive to the knotter shaft 7 and the twine needles 10 is interrupted by the one-stop clutch. During the bale formation process, the twine needles 10 are located outside of the baling channel 4. The determination of the bale length is effected with a rotatable finger-wheel 22 arranged above the baling channel 4 and the teeth-shaped circumference of which contact the bale surface. As soon as a formed bale reaches its predetemined length, the finger wheel 22 actuates, via an element (not shown), the one-stop clutch 12. The actuation of the one-stop clutch 12 provides for rotation of the knotter shaft 7 and initiation of the binding process which takes place shortly behind the end position of the plunger 3 for a short time when the return stroke of the plunger 3 begins. As a result, during the rapid binding process, the plunger 3 remains in engagement with the pressed material for a relatively longer time period which prevents material expansion and an undesirable thread loosening.

Figure 4:
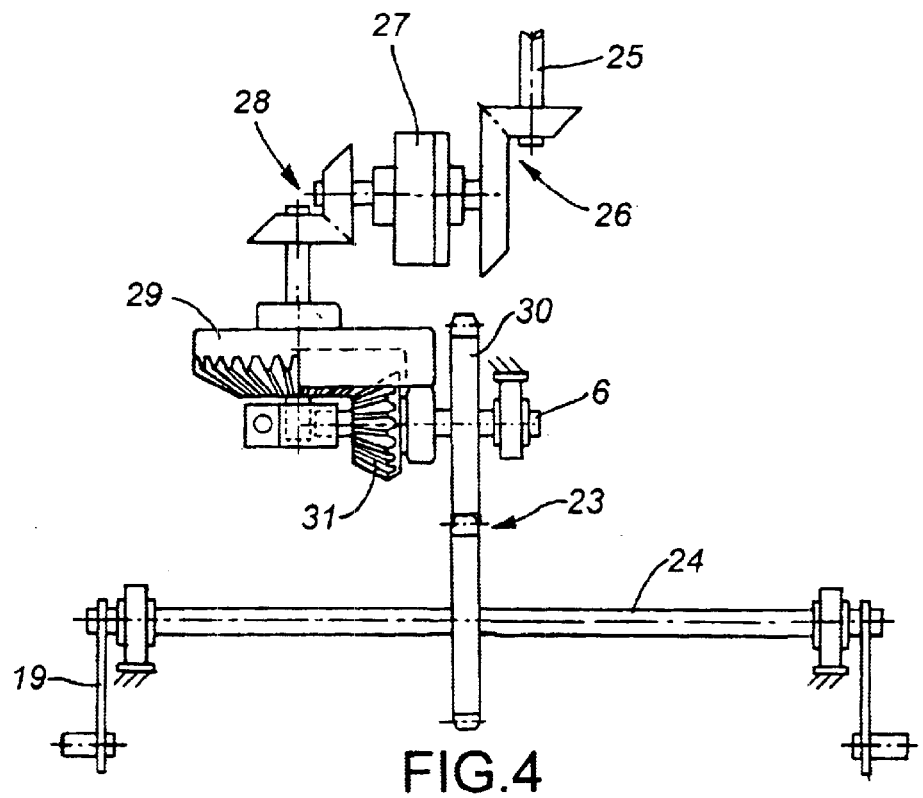
FIG. 4 a schematic view of a second embodiment of a device system of the binding device according to the present invention.

In the drive system shown in FIG. 4, the spur gear drive 23, which has a drive ratio of 1:1, is arranged half-way between the connecting shaft 6 and the knotter shaft 24. The drive of knotter shaft 24 is effected with a drive shaft 25 that cooperates with a plunger drive. From the drive shaft 25, the rotation is transmitted via a first angular device 26 to a one-stop clutch 27 and from the clutch 27 via a second angular drive 28 to a face gear segment 29 which is engaged by a pinion 31 secured to a spur gear 30. Instead of the second angular drive 28 and the face gear segment-pinion transmission, a spur gear drive in a combination with a toothed wheel segment/toothed wheel transmission can be used.

Figure 5:
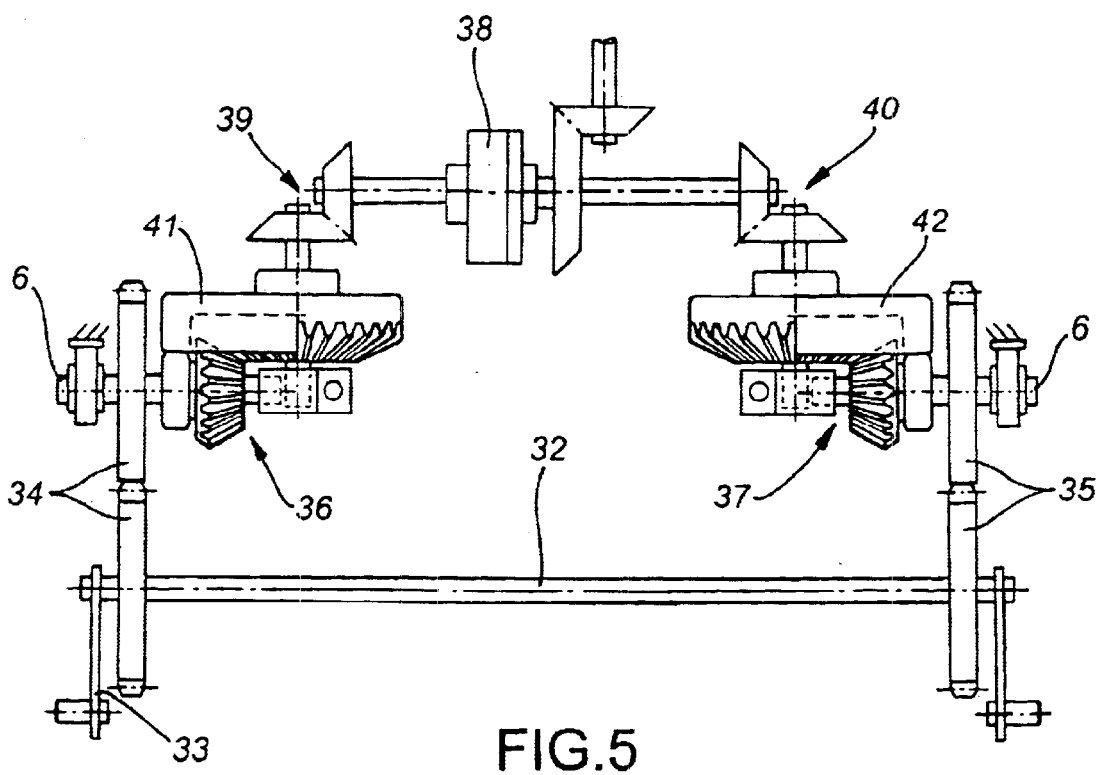
FIG. 5 a schematic view of a third embodiment of a device system of the binding device according to the present Invention.

A drive system, which is shown in FIG. 5, differs from the systems described above in that the knotted shaft 32 is connected, at its opposite side adjacent to the crank arms 33 for driving the twine needle drive, with respective spur gear drives 34, 35 associated with respective face gear segment/pinion transmissions 36, 37. The drive of the drive shaft to the respective spur gear drives 34, 35 is transmitted via a one-stop clutch 38 arranged between the spur gear drives 34, 35 and respective angular drives 39 and 40 from which the rotational drive movement is transmitted to the respective face gear 41, 42 with the drive shown in the embodiment of FIG. 5, the knotter shaft 32 practically is not subjected to any twisting.

Figure 6:
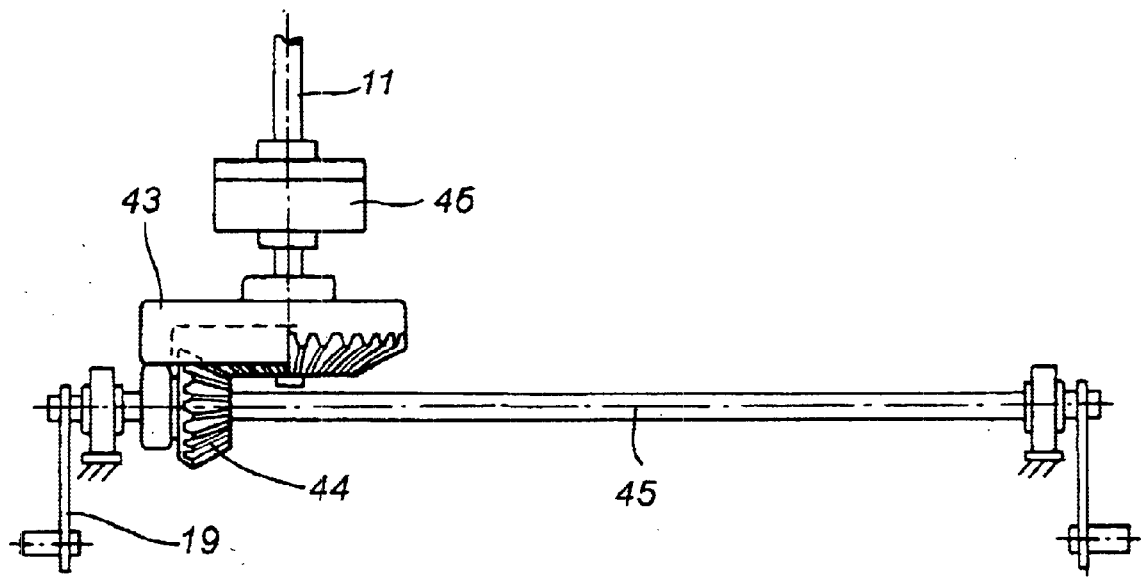
FIG. 6 a schematic view of a fourth embodiment of a device system of the binding device according to the present invention.

The embodiment of the drive, which is shown in FIG. 6, can be produced with reduced manufacturing costs but is rather bulky. In this embodiment, the pinion 44, which engages the face gear segment 43, is fixedly mounted directly on the knotter shaft 45, and the face gear 4 segment 43 is flanged directly on the output side of the one-stop clutch 46.

Figure 7:
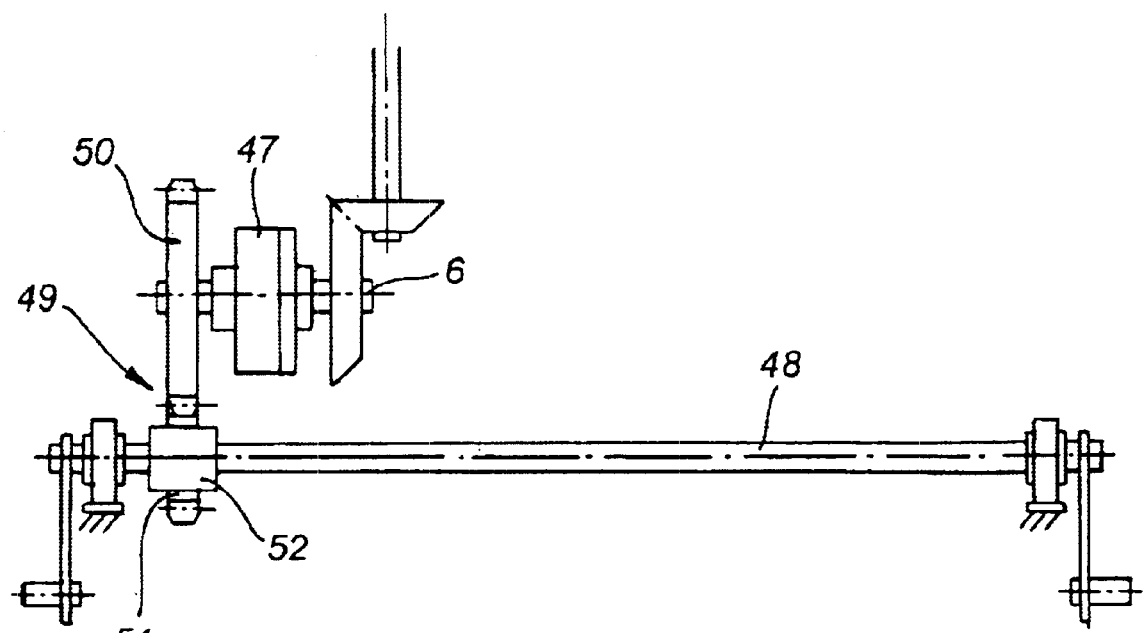
FIG. 7 a schematic view of a fifth embodiment of a device system of the binding device according to the present invention.

Another drive for driving the knotter shaft is shown in FIG. 7. In the embodiment of the drive shown in FIG. 7, a spur gear drive 49, which is provided between a one-stop clutch 47 and the knotter shaft 48, is formed of two spur gears 50, 51 the drive ratio of which is so selected that the knotter shaft 48 can be driven with a desired high rotational speed. Because both spur gears 50, 51 have teeth over their entire circumference, the start and stop of the knotter shaft 48 is controlled by an additional clutch 52 provided between the spur gear 51 and the knotter shaft 48 which insures that for one revolution of the one-stop clutch 47, the knotter shaft 48 also performs a complete revolution but with a higher speed. In the embodiment shown in FIG. 7, the spur gear 50 has twice as many teeth as the spur gear 51 so that with the rotation of the knotter shaft 48 beginning immediately with the start of the rotation of the one stop clutch 47, the clutch 52 releases the connection of the spur gear 51 with the knotter shaft 48, so that the knotter shaft 48 performs a complete revolution with a speed double of that of the one-stop clutch 47. In all other aspects, the drive system shown in FIG. 7 functions as other described systems.

Though the present invention was shown and described with references to the preferred embodiments, such are merely illustrative of the present invention and are not to be construed as a limitation thereof, and various modifications to the present invention will be apparent to those skilled in the art. It is, therefore, not intended that the present invention be limited to the disclosed embodiments or details thereof, and the present invention includes all of variations and/or alternative embodiments within the spirit and scope of the present invention as defined by the appended claims.

What is claimed is:

1. A binding device for a baler including a driven plunger, comprising at least one twine needle; a knotter shaft for driving the needle; a one-stop clutch for connecting the knotter shaft with a plunger drive and for intermittently driving the knotter shaft; and transmission means provided between the one-stop clutch and the knotter shaft and including means for insuring that for one complete revolution of the one-stop clutch, the knotter shaft also performs one complete revolution but with a speed higher than that of the one-stop clutch, wherein the transmission means includes a connecting shaft, and the insuring means comprises a gear mounted on the connecting shaft and a pinion mounted on the knotter shaft and engageable with the gear mounted on the connecting shaft.

2. A binding device as set forth in claim 1, wherein the speed of the knotter shaft is determined by a transmission ratio of the transmission means and a size of an angular region of the face gear segment engage able by the pinion.

3. A binding device as set forth in claim 1, wherein the face gear segment has a same number of teeth as the pinion.

4. A binding device as set forth in claim 1, wherein the face gear segment forms part of a face gear having at an outer circumference thereof a slide surface complementing the face gear segment to 360°, and the pinion has a smooth cylindrical section adjoining the tooth section and engageable with the slide surface of the face gear, whereby mutual rotation of the face gear and the pinion is insured in a disengagement position of the face gear segment and the tooth section of the pinion.

5. A binding device as set forth in claim 1, wherein the connecting shaft extends parallel to the knotter shaft, and wherein the face gear segment is connected with the one-stop clutch by an angular drive.

6. A binding device for a baler including a driven plunger, comprising at least one twine needle; a knotter shaft for driving the needle; a one-stop clutch for connecting the knotter shaft with a plunger drive and for intermittently driving the knotter shaft; and transmission means provided between the one-stop clutch and the knotter shaft and including means for insuring that for one complete revolution of the one-stop clutch, the knotter shaft also performs one complete revolution but with a speed higher than that of the one-stop clutch, wherein the insuring means comprises a face gear segment associated with the one-stop clutch and a pinion mounted on the connecting shaft and engageable with the face gear segment.

7. A binding device as set forth in claim 6, wherein the speed of the knotter shaft is determined by a transmission ratio of the transmission means and a size of an angular region of the face gear segment engageable by the pinion.

8. A binding device as set forth in claim 6, wherein the face gear segment has the same number of teeth as the pinion.

9. A binding device as set forth in claim 6, wherein the face gear segment forms part of a face gear having at an outer circumference thereof a slide surface complementing the face gear segment to 360°, and the pinion has a smooth cylindrical section adjoining the tooth section and engageable with the slide surface of the face gear, whereby mutual rotation of the face gear and the pinion is insured in a disengagement position of the face gear segment and the tooth section of the pinion.

10. A binding device for a baler including at least one twine needle, a knotter shaft for driving the needle, a one-stop clutch for connecting the knotter shaft with a plunger drive and for intermittently driving the knotter shaft, and a transmission unit provided between the one-stop clutch and the knotter shaft and including elements which insure that for one complete revolution of the one-stop clutch, the knotter shaft also performs one complete revolution but with a higher speed than the one-stop clutch, wherein the transmission means comprises a gear unit for transmitting rotation from the one-stop clutch to the knotter shaft, and wherein the device further comprises an additional clutch for connecting the gear unit with the knotter shaft and providing for a complete revolution of the knotter shaft upon actuation of the one-stop clutch.

11. A binding device for a baler including a driven plunger, comprising at least one twine needle; a knotter shaft for driving the needle; a one-stop clutch for connecting the knotter shaft with a plunger drive and for intermittently driving the knotter shaft; and transmission means arranged between the one-stop clutch and the knotter shaft and providing for one complete revolution of the knotter shaft for one complete revolution of the one-stop clutch and with a rotational speed higher than that of the one-stop clutch.

12. A binding device as set forth in claim 11, wherein the transmission means includes a connecting shaft a gear mounted on the connecting shaft, a pinion mounted on the connected shaft and engageable with the gear mounted on the output side of the one-stop clutch, and gear means for transmitting rotation of the connecting shaft to the knotter shaft with 1:1 ratio.

13. A binding device as set forth in claim 12, wherein the speed of the knotter shaft is determined by a transmission ratio of the transmission means and a size of an angular region of the gear engageable by the pinion.